(12) United States Patent
Callahan et al.

(10) Patent No.: US 10,519,657 B1
(45) Date of Patent: Dec. 31, 2019

(54) SYSTEMS, DEVICES, AND/OR METHODS FOR MANAGING JOISTS

(71) Applicants: Robert M. Callahan, Boones Mill, VA (US); Shawn A. Callahan, Blue Ridge, VA (US)

(72) Inventors: Robert M. Callahan, Boones Mill, VA (US); Shawn A. Callahan, Blue Ridge, VA (US)

( * ) Notice: Subject to any disclaimer, the term of this patent is extended or adjusted under 35 U.S.C. 154(b) by 0 days.

(21) Appl. No.: 15/877,172

(22) Filed: Jan. 22, 2018

(51) Int. Cl.
| | |
|---|---|
| *E04C 3/04* | (2006.01) |
| *E04C 3/12* | (2006.01) |
| *E04C 3/18* | (2006.01) |
| *E04F 13/08* | (2006.01) |
| *E04G 23/02* | (2006.01) |

(52) U.S. Cl.
CPC .............. *E04C 3/18* (2013.01); *E04C 3/04* (2013.01); *E04C 3/127* (2013.01); *E04F 13/0821* (2013.01); *E04C 2003/0413* (2013.01); *E04G 2023/0248* (2013.01)

(58) Field of Classification Search
CPC ... E04C 3/18; E04C 3/04; E04C 3/127; E04C 2003/0413; E04F 13/0821; E04G 2023/0248
See application file for complete search history.

(56) References Cited

U.S. PATENT DOCUMENTS

| | | | | |
|---|---|---|---|---|
| 2,200,159 A | * | 5/1940 | Davis, Jr. ................... | E04C 3/08 52/376 |
| 4,964,256 A | * | 10/1990 | McCracken ........... | B21D 47/01 29/897.34 |
| 5,519,977 A | * | 5/1996 | Callahan ................... | E04B 5/48 52/712 |
| D472,791 S | * | 4/2003 | Callahan ........................ | D8/349 |
| D472,792 S | * | 4/2003 | Callahan ........................ | D8/349 |
| D472,793 S | * | 4/2003 | Callahan ........................ | D8/349 |
| D477,210 S | * | 7/2003 | Callahan ........................ | D8/349 |
| 6,848,231 B2 | * | 2/2005 | Kepler ..................... | E04C 3/18 52/741.1 |
| 7,347,031 B2 | * | 3/2008 | Callahan ................... | E04B 5/12 52/715 |
| 2002/0121066 A1 | * | 9/2002 | Callahan ................... | E04B 5/12 52/713 |
| 2003/0126820 A1 | * | 7/2003 | Callahan ................... | E04B 5/12 52/514 |
| 2004/0159072 A1 | * | 8/2004 | Kepler ..................... | E04C 3/18 52/745.15 |
| 2006/0130425 A1 | * | 6/2006 | Callahan ................... | E04B 5/12 52/713 |
| 2012/0011805 A1 | * | 1/2012 | Yang ....................... | B32B 15/10 52/834 |

(Continued)

FOREIGN PATENT DOCUMENTS

GB           2487305 A    *  7/2012    ............... E04C 3/18

*Primary Examiner* — Rodney Mintz
(74) *Attorney, Agent, or Firm* — Dale Jensen, PLC; Dale Jensen

(57) ABSTRACT

Certain exemplary embodiments can provide a two piece bracket constructed to reinforce a wooden joist. The wooden joist defines a central aperture. The central aperture is constructed to substantially surround a portion of a utility conduit passing therethrough. The two piece bracket is constructed to be positioned against one side of the wooden joist. The two piece bracket comprises a first piece and a second piece.

5 Claims, 5 Drawing Sheets

(56) References Cited

U.S. PATENT DOCUMENTS

2013/0239512 A1* 9/2013 Yang .................. E04C 3/17
                                                52/741.3
2017/0073971 A1* 3/2017 Peltier ................ E04C 3/083

* cited by examiner

SYSTEMS, DEVICES, AND/OR METHODS FOR MANAGING JOISTS

CROSS-REFERENCES TO RELATED APPLICATIONS

This application is related to, and incorporates by reference herein in its entirety, issued U.S. Pat. No. 5,519,977. This application is related to, and incorporates by reference herein in its entirety, issued U.S. Pat. No. 7,347,031.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
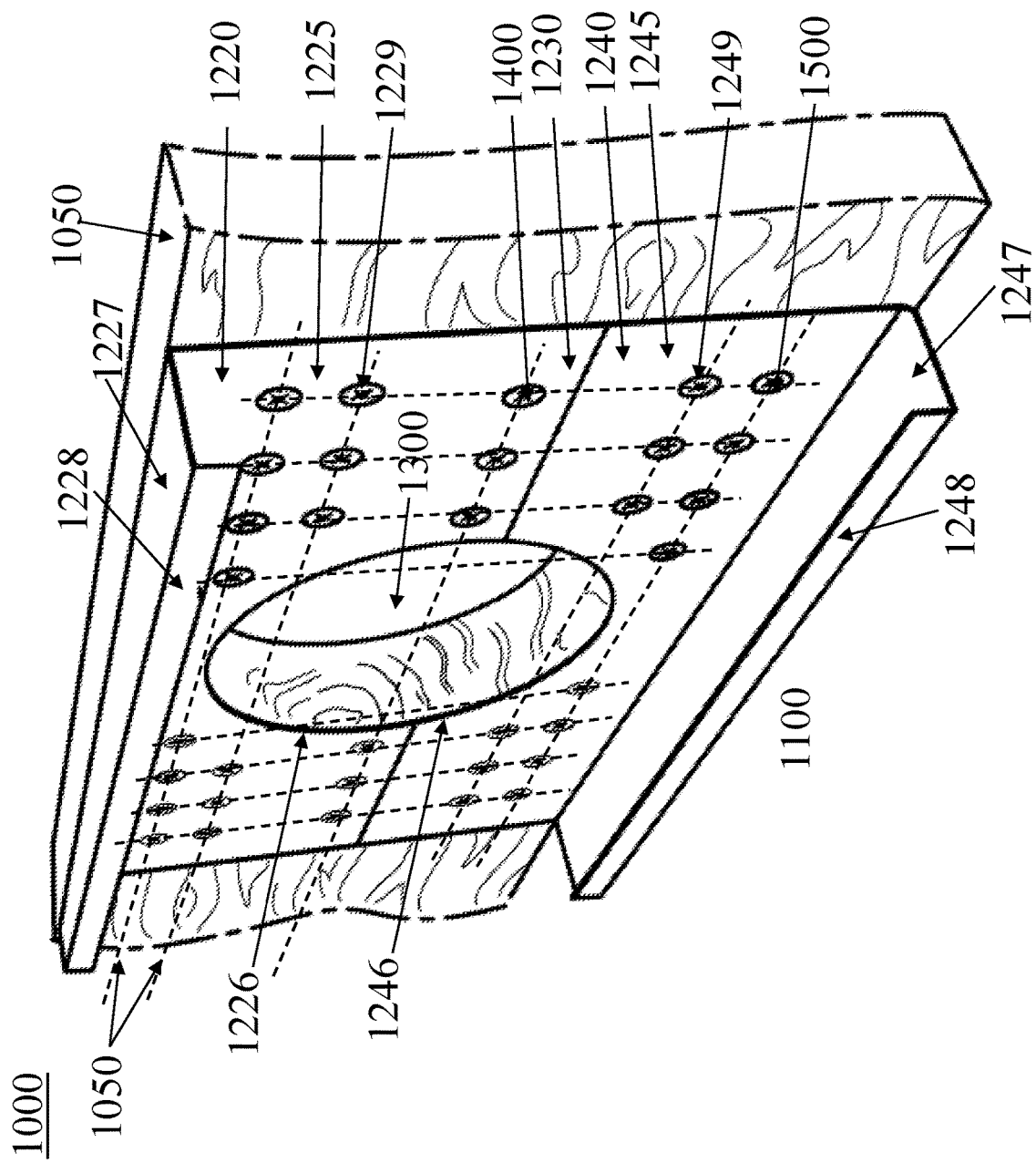
FIG. 1 is a perspective view of an exemplary embodiment of a system 1000.

Floor systems are the horizontal supporting surfaces of a building structure. Such floor systems not only support the contents of a building but also carry the weight of their own constituent parts and possibly extra load from floors and walls above. To avoid collapse, a floor system can transfer such loads laterally to beams, columns or bearing walls with some margin of safety.

In residential construction, floor systems can be assembled from a plurality of horizontal, wooden beams or joists overlaid with a plane of sheathing material. Depending upon the strength of the materials utilized, the depth of such a floor system may be varied somewhat and still meet standards for safety. Holes or cavities within the floor system can also be considered in determining the proper depth of a floor system if it is necessary to accommodate heating, plumbing, or electrical conduits.

Utility conduits can run parallel to joists in floor systems. Under certain conditions, such conduits may run perpendicular to, and penetrate, the joists. Local building codes can provide that a transverse hole bored or cut into a joist for accommodating a conduit not be closer than approximately 2 inches to the top or bottom of the joist. Further, the diameter of the hole can be specified not to exceed approximately one-third of depth of the joist. Limits can be placed upon the distance from the end of the joist where a transverse hole can be located.

Holes for plumbing drain conduits, with their relatively large diameters, can be difficult to position in wooden joists that can be used in residential building structures. Certain exemplary plumbing drain conduits have an outside diameter of approximately 3¼ inches, for instance, cannot in many areas be passed through a 2×10 joist having actual dimensions of approximately 1⅝ inches by approximately 9¼ inches. The hole of approximately 3⅝ inches to accommodate the approximate 3¼ inch diameter conduit fails to satisfy exemplary building code provisions that the hole not exceed one-third of depth of the joist. Thus, residential builders can utilize joists having larger nominal dimensions of approximately 2 inches by 12 inches, which are more expensive and somewhat heavier in weight. Certain exemplary embodiments can act as a "patch kit" to reinforce a wooden joist having a transverse hole to such an extent that it is approximately equal in load-bearing capacity to that of a similarly dimensioned joist that lacks any transverse holes.

Certain exemplary embodiments provide a bracket constructed to reinforce a wooden joist having a hole therein. The bracket comprises a split base wall with the two halves of the split base wall defining a central opening that is sized to accommodate a utility conduit disposed within the hole, for positioning against one side of the wooden joist. A pair of side walls extend at right angles from the base wall so as to provide the bracket, alternatively, with a C-shaped or S-shaped cross section. For strength, a pair of flanges extend at right angles from the pair of side walls so as to be parallel to the base wall.

Certain exemplary embodiments provide a joist reinforcing bracket of the type described that has a relatively high strength construction. Thus, the base wall is split and each baseball has a side wall and flange that can be integrally formed from a bent strip of sheet metal. To accommodate the passage of a large utility conduit, the central opening in the base wall has an exemplary diameter equal to at least two-thirds of the depth of the base wall.

Certain exemplary embodiments provide a joist reinforcing bracket with a plurality of relatively smaller openings about the central opening for the receipt of nails or other piercing fasteners for securing the bracket to a wooden joist.

Certain exemplary embodiments provide improved elements and arrangements thereof in a joist reinforcing bracket for the purposes described which is inexpensive, dependable and effective in accomplishing its intended purposes.

FIG. 1 is a perspective view of an exemplary embodiment of a system 1000. System 1000 comprises a two piece bracket 1100 constructed to reinforce a wooden joist 1050. Wooden joist 1050 defines a central aperture 1300. Central aperture 1300 is constructed to substantially surround a portion of a utility conduit passing therethrough. Two piece bracket 1100 is constructed to be positioned against one side of wooden joist 1050. Two piece bracket 1100 comprises:

a first piece 1220, which comprises a first base wall portion 1225, first base wall portion 1225 has a length and a depth, first base wall portion 1225 defines a first substantially semicircular central notch 1226 that is approximately a same diameter as a diameter of central aperture 1300 of wooden joist 1050, the diameter of central aperture 1300 equal to at least one-half of the depth of first base wall portion 1225, the diameter of central aperture 1300 equal to at least one-fourth of the length of first piece 1220, first piece 1220 comprising an integral first sidewall 1227, first sidewall 1227 extending from first base wall portion 1225 at substantially a right angle, first piece 1220 comprising an integral first flange 1228 that extends from first sidewall 1227 at a substantial right angle such that integral first flange 1228 is substantially parallel to first base wall portion 1225, wherein first piece 1220 defines a first plurality of fastener apertures 1229, first piece 1220 coupleable to wooden joist 1050 via a first plurality of fasteners 1400 engaged with plurality of fastener apertures 1229; and a second piece 1240, which comprises a second base wall portion 1245, second base wall portion 1245 having the length and the depth, second base wall portion 1245 defining a second substantially semicircular central notch 1246 that is approximately a same diameter as the diameter of central aperture 1300 of wooden joist 1050, second piece 1240 comprising an integral second sidewall 1247, second sidewall 1247 extending from second base wall portion 1245 at substantially a right angle, second piece 1240 comprising an integral second flange 1248 that extends from second sidewall 1247 at a substantial right angle such that second flange 1247 is substantially parallel to second base wall portion 1245, wherein second piece 1240 defines a second plurality of fastener apertures 1249, second piece 1240 coupleable to wooden joist 1050 via a second plurality of fasteners 1500 engaged with plurality of fastener apertures 1249.

Figure 3:
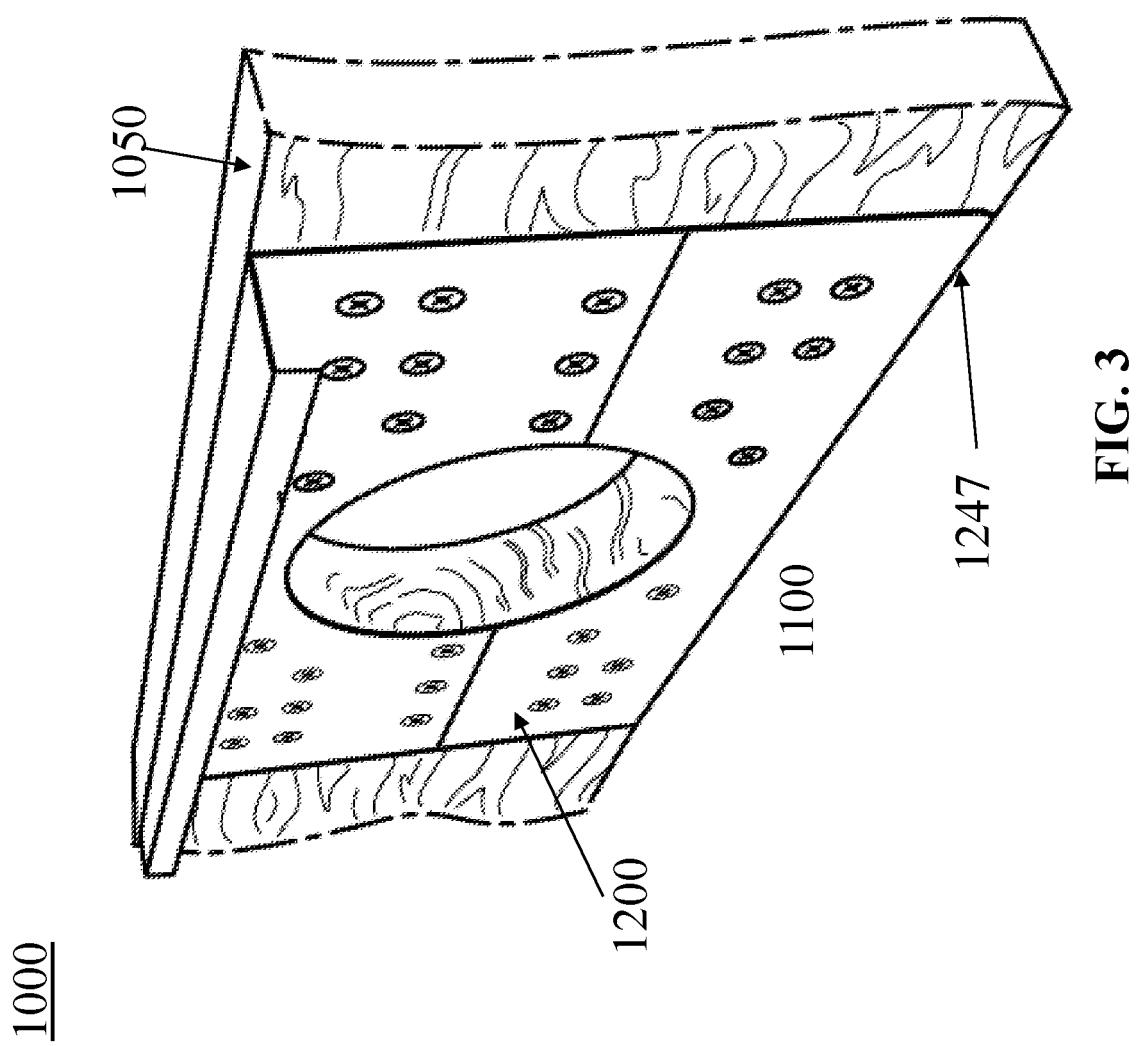
FIG. 3 is a perspective view of an exemplary embodiment of system 1000.

When operatively coupled to wooden joist 1050, two piece bracket 1100 can have C-shaped cross section. When operatively coupled to wooden joist 1050, two piece bracket 1100 can nave a S-shaped cross section (as illustrated in FIG. 3). First piece 1220 can define 18 fastener apertures as illustrated in FIG. 1; where 12 of the apertures are used solely couple first piece 1220 to wooden joist 1050. Second piece 1240 also defines 18 fastener apertures as illustrated in FIG. 1; where 12 of the apertures are used solely couple first piece 1220 to wooden joist 1050. First piece 1220 and second piece 1240 have an overlap 1230 such that the remaining six apertures of each of first piece 1220 and second piece 1240 align with each other and are used to jointly couple first piece 1220 and second piece 1240 to wooden joist 1050. In certain exemplary embodiments, centerlines drawn between apertures of first plurality of fastener apertures 1229 define a grid 1050. In certain exemplary embodiments, centerlines drawn between apertures of first plurality of fastener apertures 1229 define a grid 1050, with none of the first plurality of fastener apertures not on the grid.

Two piece bracket 1100 can be utilized in remodeling. A current code provision requires any utilities to be upgraded to the current code. Therefore, houses that are over 20 years old no longer pass current code requirement for holes depths in wood joists. The Remodeling industry can utilize exemplary brackets for a repair since the use of deeper or replacing the joist is not a viable option. In a lot of cases a utility is already in place when a building official points out that the hole is to large. Therefore, the bracket to perform can be used to perform such repairs and can be installed after the utilities (i.e., conduits).

Two piece bracket 1100 is shown in use within a wood joist floor system. Wooden joist 1050 comprises a length of construction grade lumber cut to suitable dimensions, e.g., a nominal 2×10 inches. Although only one wooden joist 1050 is illustrated in FIG. 1 for brevity, additional joists can be employed in construction of a floor system. In such systems, a plurality of joists can be laterally spaced, for example, in a range of 16 to 24 inches apart depending upon anticipated structural loads. As two piece bracket 1100 secures to wooden joist 1050 during use, a plurality of joist reinforcing brackets can be employed in a finished floor system wherein corresponding holes for the passage of an elongated conduit are formed in several joists. Of course, a plurality of brackets may be secured to wooden joist 1050 should a need arise.

As shown, two piece bracket 1100 has a C-shaped cross section. Each of first piece 1220 and second piece 1240 can be formed by rolling or bending a thin, rectangular strip of sheet metal into the desired shape. For example, sheet metal comprising 18-gage galvanized steel, or any other suitable metallic composition, can be utilized in forming each of first piece 1220 and second piece 1240. As shown, the depth two piece bracket 1100 is substantially the same as that of the wooden joist 1050, which can be approximately 9 inches in an exemplary embodiment. The length of two piece bracket 1100, on the other hand, may be varied to suit the needs of a particular user; however, approximately 12 inches has been determined to be suitable for use in certain exemplary wood joist floor systems.

Figure 2:
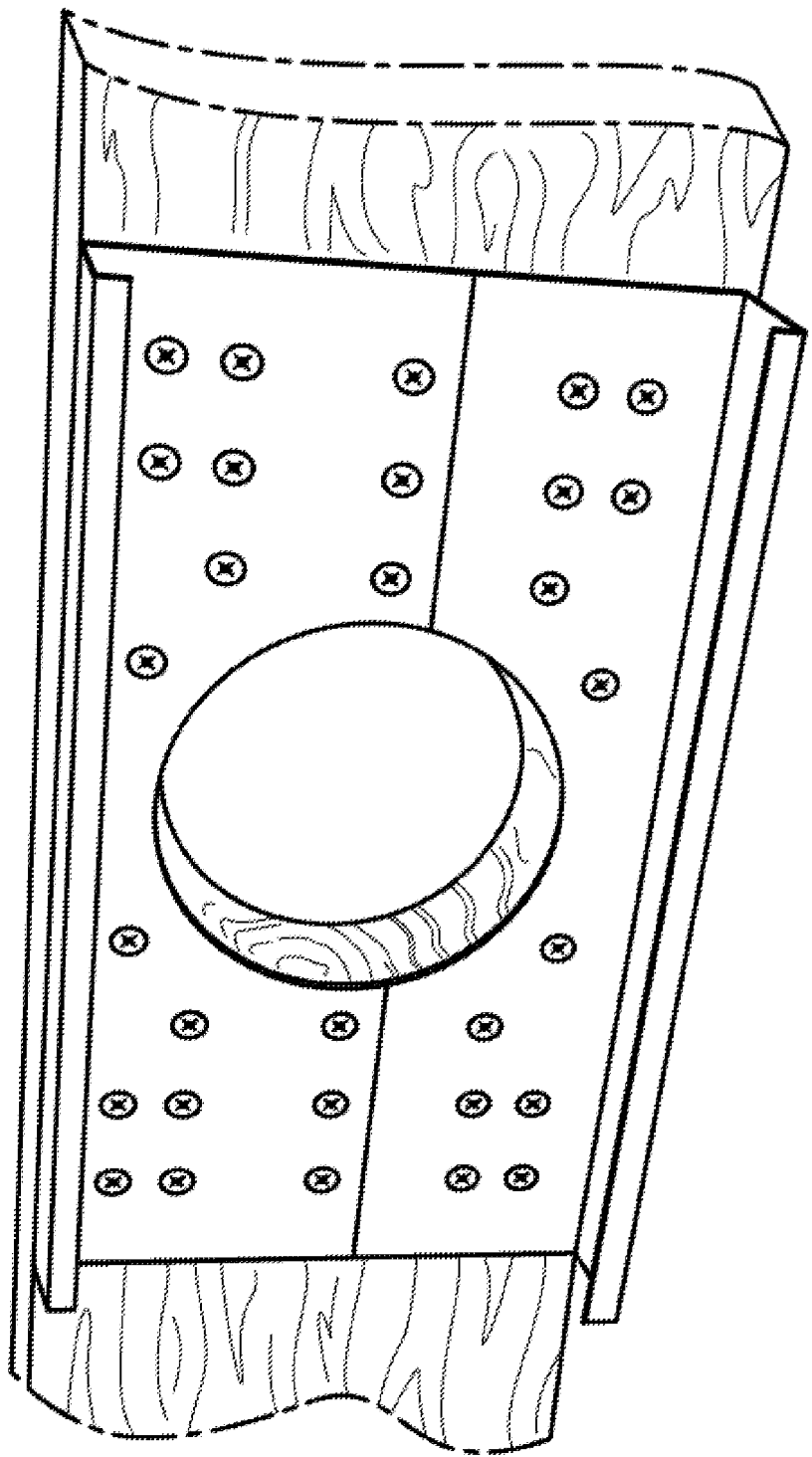
FIG. 2 is a perspective view of an exemplary embodiment of system 1000.

FIG. 2 is a perspective view of an exemplary embodiment of system 1000 showing a different view angle from FIG. 1.

FIG. 3 is a perspective view of an exemplary embodiment of system 1000, which illustrates, when operatively coupled to wooden joist 1050, two piece bracket 1100 can have a S-shaped cross section. As illustrated, second piece 1240 is flipped relative to the orientation shown in FIG. 1. Thereby, second sidewall 1247 is placed under wooden joist 1050 and thereby giving two piece bracket 1100 an S-shaped cross section as shown.

Figure 4:
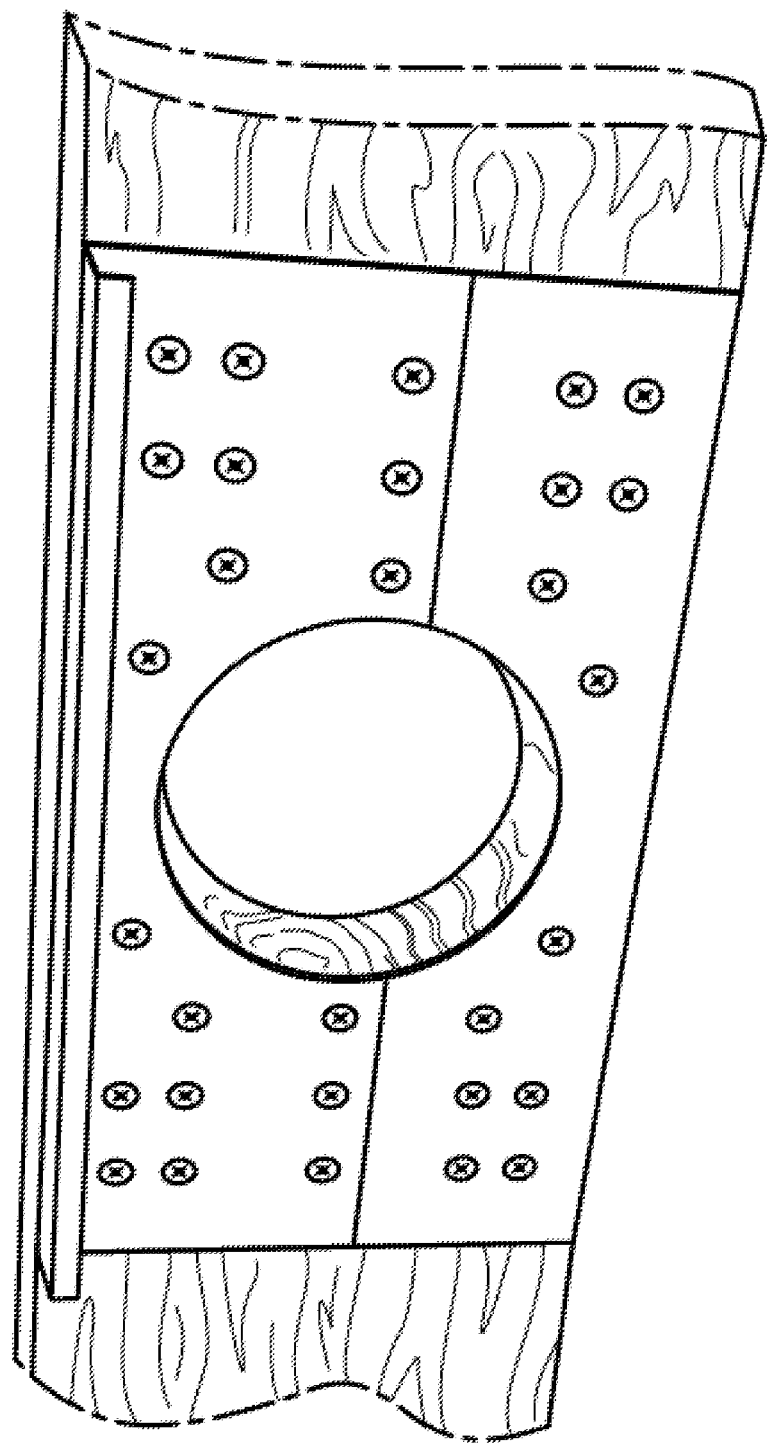
FIG. 4 is a perspective view of an exemplary embodiment of system 1000.

FIG. 4 is a perspective view of an exemplary embodiment of system 1000, which is substantially similar to FIG. 3 shown from a slightly different angle.

Figure 5:
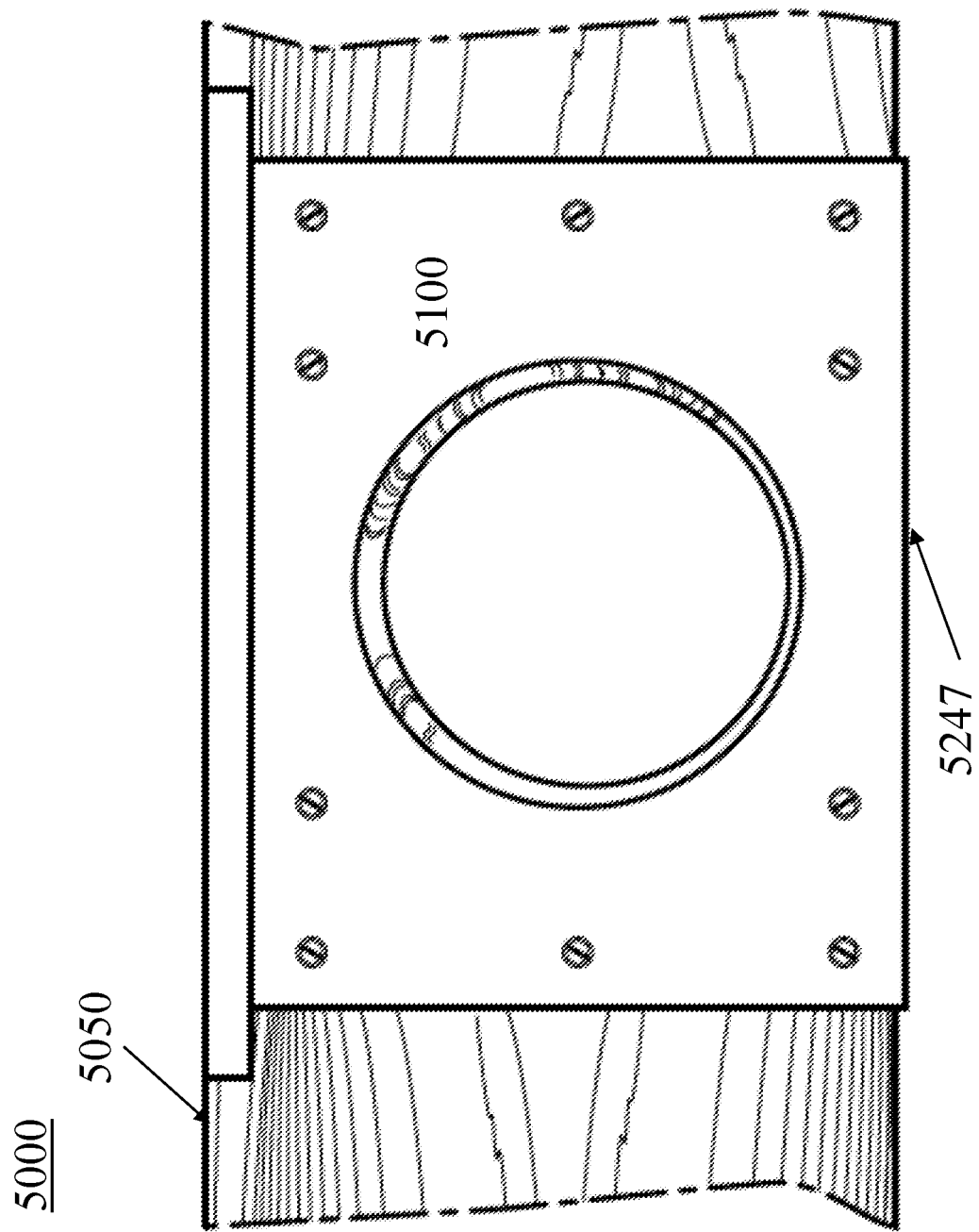
FIG. 5 is a perspective view of an exemplary embodiment of a system 5000.

FIG. 5 is a perspective view of an exemplary embodiment of a system 5000, which illustrates a unitary joist bracket 5100. The illustrated embodiment is of joist bracket 5100 having an S-shaped cross section with a sidewall 5247 placed under a joist 5050.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof
and/or—either in conjunction with or in alternative to.
aperture—an opening defined by an object.
apparatus—an appliance or device for a particular purpose.
base wall portion—a part of a bracket that
bracket—a support coupleable to a wooden joist that projects from the floor joist and provides structural support to the floor joist or an appurtenance thereof.
can—is capable of, in at least some embodiments.
cause—to produce an effect.
central notch—a cut or formed indentation or incision on a surface of a bracket that allows the bracket to at least partially surround something passing through a joist.
comprising—including but not limited to.
connect—to join or fasten together.
constructed to—made to and/or designed to.
coupleable—capable of being joined, connected, and/or linked together.
coupling—linking in some fashion.
cross section—a view of a 3-dimensional object from a position of a plane cutting through the object.
define—to establish the outline, form, or structure of
depth—a measurement of an extent of an object in a single dimension that is a least of three dimensions of the object.

device—a machine, manufacture, and/or collection thereof.

diameter—a length of a straight line between points on edges of the circle intersected by the straight line, wherein the straight line passes through the center of a circle.

engage—to move into an operative position such that two things are coupled together.

fastener—a hardware device that mechanically couples two or more objects together.

flange—a portion of a bracket that defines fastener apertures and is coupleable via the fastener apertures to an edge of a joist.

grid—a set of substantially uniformly spaced horizontal and perpendicular lines.

install—to connect or set in position and prepare for use.

integral—formed or fabricated as a part of a larger whole so as to not be nondestructively uncoupleable from the larger whole.

joist—a member that supports a part of a structure of a building.

length—a measurement of an extent of an object in a single dimension that is a greatest of three dimensions of the object.

may—is allowed and/or permitted to, in at least some embodiments.

method—a process, procedure, and/or collection of related activities for accomplishing something.

operatively—in a manner allowing a device and/or system to function.

plurality—the state of being plural and/or more than one.

portion—a part of something.

position—to place something in a particular location and/or orientation.

predetermined—established in advance.

probability—a quantitative representation of a likelihood of an occurrence.

reinforce—to strengthen and/or support.

repeatedly—again and again; repetitively.

semicircular—shaped like a bisected circle.

set—a related plurality.

sidewall—a portion of a bracket comprising a substantially planar surface that is between a base wall portion of the bracket and a flange of the bracket.

substantially—to a great extent or degree.

support—to bear the weight of, especially from below.

surround—to physically encircle something.

system—a collection of mechanisms, devices, machines, articles of manufacture, processes, data, and/or instructions, the collection designed to perform one or more specific functions.

utility conduit—a tube used to enclose and route electrical wiring in a building or structure.

via—by way of and/or utilizing.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
a two piece bracket constructed to reinforce a wooden joist, the wooden joist defining a central aperture, the central aperture constructed to substantially surround a portion of a utility conduit passing therethrough, the two piece bracket constructed to be positioned against one side of the wooden joist, the two piece bracket comprising:
a first piece, the first piece comprising a first base wall portion, the first base wall portion having a length and a depth, the first base wall portion defining a first substantially semicircular central notch having a diameter at least as great as a diameter of the central aperture of the wooden joist, the diameter of the central aperture equal to at least one-half of the depth of said first base wall portion, the diameter of the central aperture equal to at least one-fourth of length of the first piece, the first piece comprising an integral first sidewall, the first sidewall extending from the first base wall portion at substantially a right angle, the first piece comprising an integral first flange that extends from the integral first sidewall at a substantial right angle such that the integral first flange is substantially parallel to the first base wall portion, wherein the first piece defines a first plurality of fastener apertures, the first piece coupleable to the wooden joist via a first plurality of fasteners engaged with the first plurality of fastener apertures; and a second piece, the second piece comprising a second base wall portion, the second base wall portion having the length and the depth, the second base wall portion defining a second substantially semicircular central notch that is approximately a same diameter as the diameter of the central aperture of the wooden joist, the second piece comprising an integral second sidewall, the second sidewall extending from the second base wall portion at substantially a right angle, the second piece comprising an integral second flange that extends from the integral second sidewall at a substantial right angle such that the integral second flange is substantially parallel to the second base wall portion, wherein the second piece defines a second plurality of fastener apertures, the second piece coupleable to the wooden joist via a second plurality of fasteners engaged with the second plurality of fastener apertures;

wherein, the first piece and second piece overlap such that one or more of the first plurality of fasteners align with the second plurality of fasteners when the first piece and the second piece are operatively coupled to the wooden joist, and wherein centerlines drawn between respective said apertures of the first plurality of fastener apertures define a grid, with each of the first plurality of fastener apertures located on the grid.

2. The system of claim 1, wherein:
when operatively coupled to the wooden joist, the two piece bracket has a C-shaped cross section.

3. The system of claim 1, wherein:
when operatively coupled to the wooden joist, the two piece bracket has a S-shaped cross section.

4. The system of claim 1, wherein:
the first piece defines twenty fastener apertures.

5. The system of claim 1, wherein:
the second piece defines fourteen fastener apertures.

* * * * *